July 5, 1966 S. VAN MANEN 3,258,961
TORQUE MONITORING SYSTEM
Filed May 7, 1964 2 Sheets-Sheet 1
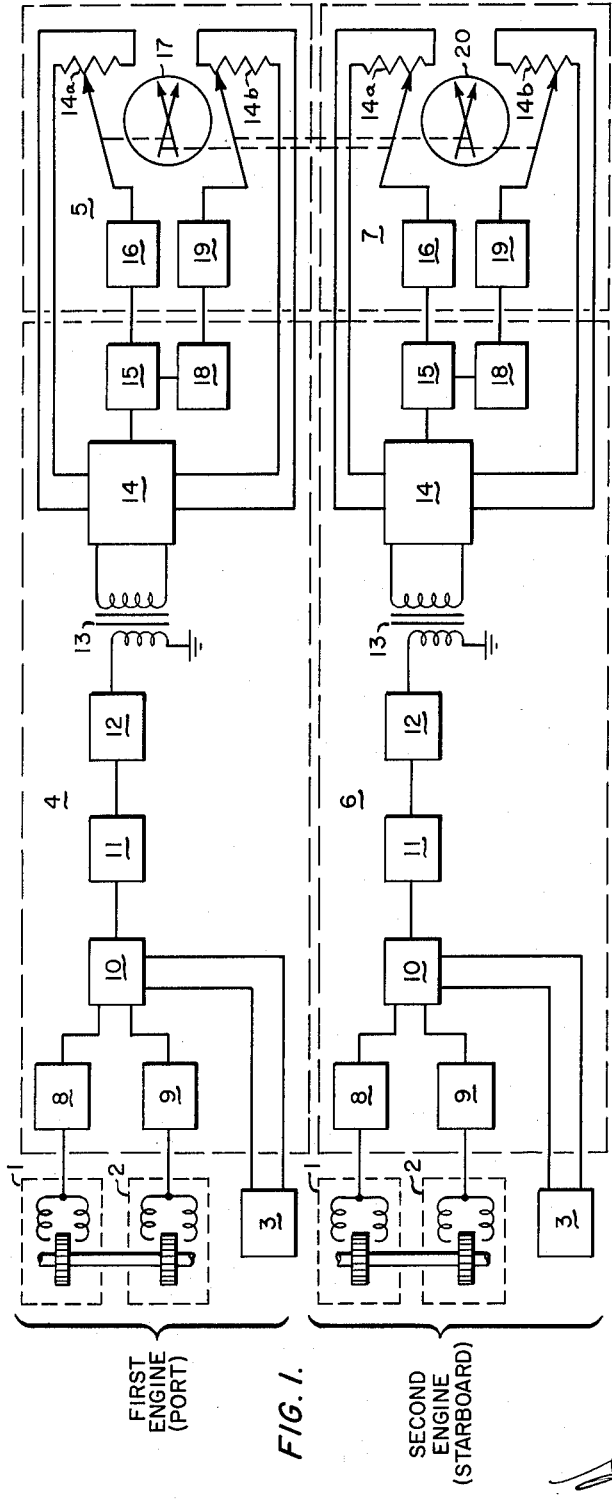
FIG. I.
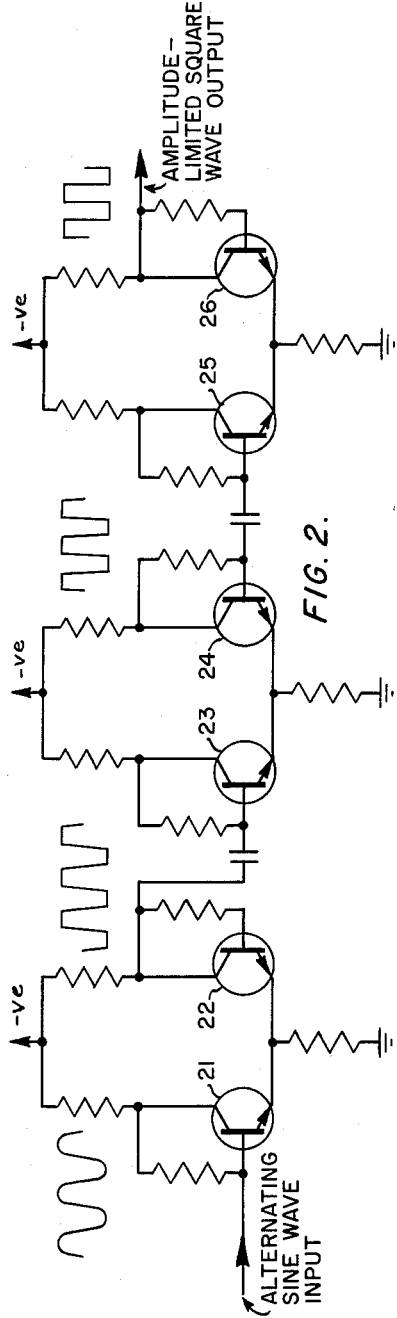
FIG. 2.
INVENTOR.
Siderius van Manen
BY

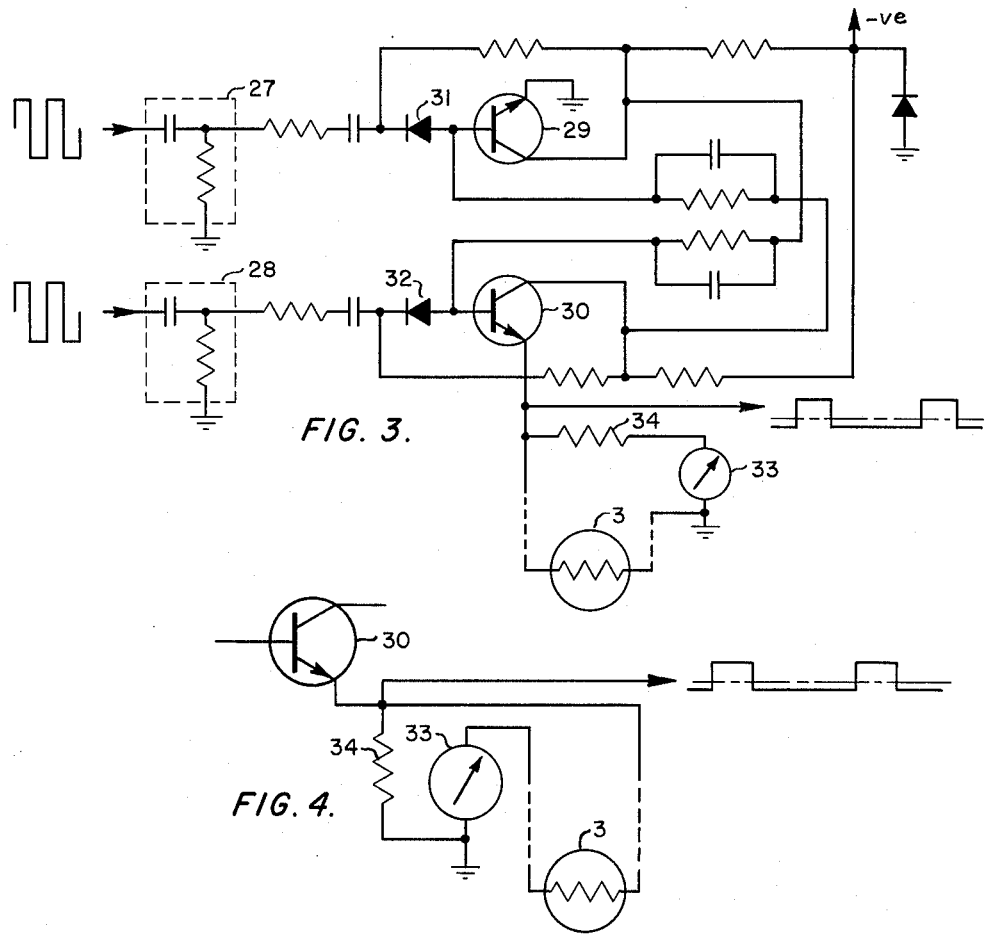
FIG. 3.
FIG. 4.
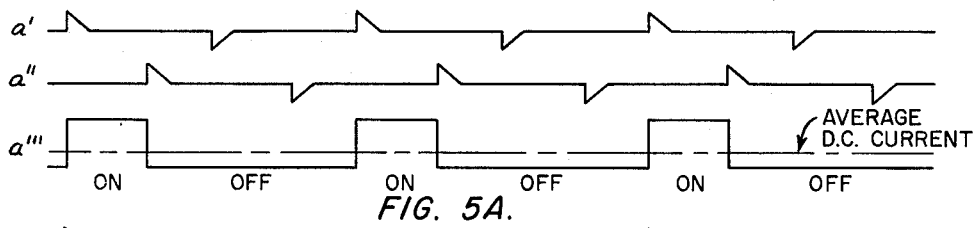
FIG. 5A.
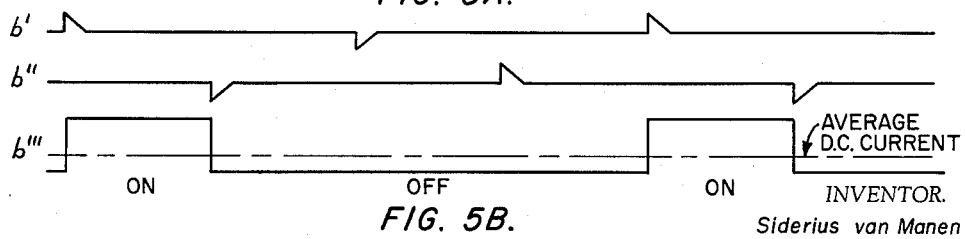
FIG. 5B.
INVENTOR.
Siderius van Manen

United States Patent Office 3,258,961
Patented July 5, 1966

3,258,961
TORQUE MONITORING SYSTEM
Siderius Van Manen, Wayne, N.J., assignor to Simmonds Precision Products, Inc., Tarrytown, N.Y., a corporation of New York
Filed May 7, 1964, Ser. No. 365,613
11 Claims. (Cl. 73—136)

This invention relates to apparatus for measuring torque, and particularly but not exclusively relates to the measurement of torque in the shaft or an aircraft engine.

It is one object of this invention to provide a torque measuring device for measuring the torsional deflection of a coupling shaft between an engine and gear box in an aircraft.

It is another object of this invention to provide a torque indicator system which employs two toothed wheels spaced along the shaft coupling an engine and gear box in an aircraft, the relative rotational movement of toothed wheels being measured to provide a direct indication of the torsional deflection in the shaft.

It is another object of this invention to provide an indicator system as described above in which the rotational movement of the toothed wheels is translated into alternating current signals, the phase displacement between which is indicative of the torsional deflection in the shaft.

It is another object of this invention to provide a torque monitoring system for monitoring the torque in the port and starboard engine shafts in an aircraft, the torques in the two shafts being indicated by two pointers on a meter for observation by the pilot of the aircraft and the torques being indicated in addition by two pointers on a meter for observation by the co-pilot.

It is another object of this invention to provide a torque monitoring system as described above in which two toothed wheels are spaced along each engine shaft the rotation of which wheels is translated into alternating current signals, the signals having a phase displacement corresponding to the relative rotational movement of the two toothed wheels which is directly related to the torsional deflection of the shaft, and means being provided for measuring the phase displacement on a meter calibrated in percentage torque values.

These and other objects and further features of the invention will become apparent from the following description of one exemplified embodiment of the invention, described with reference to the accompanying drawings, in which:

FIGURE 1 is a block diagram of one form of an engine torque-measuring system according to this invention;

FIGURE 2 is a circuit diagram of a squaring circuit in said system for converting alternating sine-wave signals into square wave signals;

FIGURE 3 is a circuit diagram of a phase detector circuit in said system;

FIGURE 4 is a circuit diagram of a temperature-compensation network employed in FIGURE 3 as an alternative to the temperature-compensation network shown in this latter figure; and FIGURES 5a and 5b are diagrams of the waveforms and pulses obtained at various points in the phase detector circuit when the shaft is rotating at both a high speed and a low speed.

Briefly, in one particular application a torque indicator according to this invention is operative to measure torsional deflection of a shaft coupled between the engine and a gear box in an aircraft propulsion system. Each engine is provided with a transducer assembly which consists of a magnetic pickup in close proximity to a disc having teeth formed on its circumference, and a similar (reference) disc is located at a fixed distance from the first disc and also has a magnetic pickup in close proximity thereto. As the main coupling shaft between the engine and the gear box is subjected to torque its torsional deflection varies linearly along its length with the applied torque for a constant shaft temperature. As a result, the phase difference between the voltages induced in the two magnetic pickups varies with torque so that at full torque, the torsional deflection of the shaft approximately corresponds to the deflection of one tooth width which is equivalent to an electrical displacement of 360° in the phase of the output voltages. The phase displacement at any instant is continuously measured and employed to deflect a pointer on a meter calibrated in percentage torque values. Preferably, meters are provided for both pilot and co-pilot and each meter may include a plurality of pointers e.g. two, respectively indicative of the torque in the shafts of two (port and starboard) engines.

Zero torque may be arbitrarily established at 30° phase displacement between the voltages and the phase displacement will then vary linearly with engine torque at a nominal rate of 0.2° per ft.-lb. A temperature-sensitive resistance is provided to permit temperature correction of the indicated torque.

The transducer assembly employed may conveniently be that supplied as an integral part of the General Electric Company's engine T64–CE–6.

Referring now to the drawings the above system will be more particularly described.

Referring to FIGURE 1 each engine has a reference sensor 1 and a torque sensor 2 for producing electrical signals indicative of engine shaft torque, and a temperature-sensitve compensating resistance 3. The sensors and the resistance are conveniently embodied in the transducer assembly described above.

The outputs fro mthe sensors and resistance in the transducer assembly in the first engine are applied to an evaluation circuit 4 and a meter device 5 and the outputs from the transducer assembly in the second engine are applied to an evaluation circuit 6 and a meter device 7. The same components are employed in these circuits and meters and like components have been similarly referenced in the drawings. For the purposes of this description however only the evaluation circuit 4 and the meter device 5 will be described in detail.

The outputs from the sensors 1 and 2 are approximately sinusoidal in form and are applied respectively to squaring amplifiers 8 and 9 which function to remove the amplitude modulation of these outputs which may be as much as ±13% of the average amplitude.

The two squared signals are then applied to the input terminals in a detector and phase comparator 10. This circuit compares the phases of the two signals and is connected to the compensating resistance 3 to effect temperature correction. The resultant mean D.C. output from this circuit 10 may conveniently vary between 0 and 5 volts and correspond linearly to the full range of torque. In addition, a small negative D.C. voltage capability must be provided for to account for the negative torque which may exist during normal operation.

The D.C. output is applied to a chopper circuit 11 to provide an alternating output which is amplified in amplifier 12 and applied to the primary winding of a transformer 13.

The secondary winding of this transformer supplies two phase opposing voltages to a bridge network 14. Any change in the magnitude of the input signal to this transformer 13 results in an output being produced from the bridge network 14 having a phase indicative of the sense of the change and a magnitude indicative of the magnitude of the change. This output is applied through a master amplifier 15 to a two-phase servo-motor 16 which mechanically drives, through a gear train, the wiper of a potentiometer 14a in the bridge network in a sense such as to reduce towards zero the output from this network.

The wiper of potentiometer 14a is coupled to a pointer on a meter 17 which is calibrated in percentage torque of the shaft of the first engine.

In addition, a repeater amplifier 18 is connected to a further two phase servo-motor 19 which mechanically drives the wiper of a potentiometer 14b in the bridge network in response to an output from said network. The wiper of potentiometer 14b is coupled to a pointer on a meter 20 which is also calibrated in percentage torque of the shaft of the first engine.

The bridge network, servo motors and rebalancing potentiometers thus constitute a closed loop servo system for the two meters 17 and 20, the meter 17 being disposed for observation by the pilot, and the meter 20 being disposed for observation by the co-pilot, of the aircraft.

Calibration points are provided in the bridge network and the overall accuracy of the system may be ±0.5 percent of full scale (1,200 ft. lbs.).

The reliability of the system is enhanced by the servo motors being designed to be operated at stall speed substantially indefinitely without damage, thereby avoiding the need for a clutch mechanism to be incorporated between the servo motor and the gear train.

Referring now to FIGURE 2 there is shown a detailed circuit diagram of one of the squaring circuits. An alternating input signal from the engine shaft transducer is applied to the base of one transistor 21 of a first emitter-coupled stage comprising a pair of transistors 21, 22. These transistors are biased so that they amplify the input signals symmetrically. The gain of the transistors in this stage is such that the signal is limited both at saturation and cut-off to provide a square wave output which consists only of the amplified and amplitude-limited center portion of the applied sine wave. Two further stages comprising emitter-coupled transistors 23, 24 and 25, 26 are connected in cascade to provide an amplitude-limited substantially square wave output signal.

Referring now to FIGURE 3, the outputs of the two squaring circuits 8 and 9 are respectively applied to CR differentiating circuits 27, 28 in the detector and phase comparator 10. The leading edge of these differentiated signals thus correspond to the times of instantaneous zero magnitude of the alternating inputs from the torque transducer assembly, which inputs are approximately sinusoidal over the frequency range 7.8 to 20.4 kilocycles/second depending on the rotational speed of the engine shaft. The differentiated pulses from the circuits 27, 28 are then applied to the base electrodes of transistors 29 and 30, respectively, of a bistable multivibrator circuit through isolating diodes 31 and 32. The bistable multivibrator is turned "on" to exhibit one of its stable states by the first positive-going differentiated "reference" pulse received and is subsequently turned "off" by the following differentiated "torque" pulse. The fractional "on" time is indicative of the phase displacement between the "reference" pulse produced by the sensor 1 and the torque pulse produced by the sensor 2 and corresponds directly to a torque value.

Temperature compensation of the output signal from the bistable multivibrator is effected by connecting a temperature-sensitive resistance 3 in the emitter circuit of transistor 30, the resistance 3 being connected in parallel with a series-connected emitter resistor 34 and an output indicator 33. Alternatively, the emitter resistor 34 may be connected in parallel with a series connection of the temperature-sensitive resistance 3 and the indicator 33 as shown in FIGURE 4.

This detector and phase comparator circuit operates substantially independently of any changes in the engine shaft speed over the aforesaid frequency range and this is illustrated in FIGURES 5a and 5b. In these figures the differentiated "reference" signals are shown along ordinates 5a', 5b' the differentiated "torque" signals are shown along ordinates 5a", 5b" and the periods for which the multivibrator is "on" (transistor 30 conducting) and "off" (transistor 30 substantially non-conducting) are shown along ordinates 5a''', 5b'''.

It can be seen that at high shaft speeds (FIGURE 5a) the periods for which the multivibrator is "on" and "off" are both shorter than the corresponding periods for a low shaft speed (FIGURE 5b). The average value of the D.C. collector current however, which is indicative of the torque, remains the same in both cases.

Solid state components are used throughout the squaring circuits 8 and 9, the detector and phase comparator 10, the chopper 11, the amplifiers 12 and the control circuits for the meter devices 5 and 7, thus providing a high degree of reliability.

Means may be provided for ensuring that the meters 17 and 20 read zero torque in the event of power or signal failure, or alternatively a fail safe indication may be provided consisting of two warning flags (one for each engine) on the face of the meter which will indicate "RED" when either a power or signal failure occurs.

Although there has been shown what is considered to be a preferred embodiment of the invention it will be evident that many modifications and changes may be made without departing from the scope of the invention as defined in the following claims.

I claim:

1. In a rotary shaft torque-measuring system,
two tooth wheels spaced apart along said shaft,
transducer means mounted adjacent said toothed wheels for generating alternating signals in response to the rotating of the wheels having a phase displacement indicative of the torsional deflection of said shaft between the wheels,
a phase detection circuit connected to said transducer means for producing an output signal indicative of the phase displacement between said alternating signals, and
a bridge network having an input circuit connected to receive said output signal from said phase detector and an output circuit for producing an output indicative of the magnitude and sense of any change in said output signal.

2. In a rotary shaft torque-measuring system,
transducer means mounted on said shaft in spaced relationship for generating alternating signals in response to the rotation of said shaft and having a phase displacement indicative of the torsional deflection of said shaft between the spaced apart transducer means,
a phase detection circuit connected to said transducer means for producing an output signal indicative of the phase displacement between said alternating signals,
a bridge network having an input circuit connected to receive said output signal from said phase detector and an output circuit for producing an output indicative of the magnitude and sense of any change in said output signal, and
indicator means connected to said bridge network and responsive to said output therefrom for providing an indication of the torque in said shaft in dependence on the output from said bridge network.

3. In a rotary shaft torque-measuring system,
a source of electrical supply,
a pair of electromagnetic circuits connected to said supply source and spaced apart along said shaft for generating alternating signals in response to the rotation of said shaft and having a phase displacement indicative of the torsional deflection of said shaft between the spaced apart circuits,
amplitude-limiting means for converting each of said alternating signals into substantially square wave signals, a phase detector connected to said amplitude-limiting means for producing an output signal indicative of the phase displacement between said square wave signals, a bridge network having an input circuit connected to receive said output signal from said phase detector and an output circuit for producing an output indicative of the magnitude and sense of any change in said output signal and indicator means connected to said bridge network and responsive to said output therefrom for providing an indication of the torque in said shaft in dependence on the output from said bridge network.

4. A system according to claim 3, wherein said phase detector comprises two differentiating circuits for receiving and differentiating corresponding ones of the two square wave signals, a bistable multivibrator comprising two transistors for receiving corresponding ones of the two differentiated signals and each exhibiting a non-conductive and conductive state in succession, each transistor being switched from one to its other state by the leading edge of the differentiated signal applied thereto and the other state of one of the transistors switching the other transistor to said one state whereby said multivibrator manifests a train of pulses the mean D.C. value of which constitutes said phase detector output signal.

5. A system according to claim 4, further comprising temperature compensating means comprising a temperature-sensitive resistance mounted adjacent said shaft and connected to the output of said multivibrator for varying the said mean value in dependence on the temperature of said shaft.

6. A system for measuring torque in a rotary shaft comprising two discs spaced apart along said shaft, transducer means mounted adjacent said discs for respectively generating first and second alternating signals in response to the rotation of the discs the two alternating signals having a phase displacement corresponding to the torsional deflection of that portion of the shaft between the discs, first and second squaring circuits for receiving and converting corresponding ones of the first and second alternating signals into substantially square wave signals, first and second differentiating circuits for receiving and differentiating corresponding ones of the two square wave signals, a bistable switching circuit comprising two transistors for receiving corresponding ones of the first and second differentiated signals and together producing a train of output pulses the mean D.C. value of which is indicative of said phase displacement, temperature compensating means comprising a temperature-sensitive resistance mounted adjacent said shaft and connected to the output of said switching circuits for varying the said mean value in dependence on the temperature of said shaft, and circuit means responsive to said temperature-compensated mean value for providing an indication of the torque in said shaft in dependence on said mean value.

7. A rotary shaft torque-measuring system comprising two digitated members spaced apart along said shaft, transducer means mounted adjacent said members for respectively generating first and second alternating signals in response to the rotation of the two members, the two alternating signals having a phase displacement corresponding to the torsional deflection of that portion of the shaft between the members, amplitude-limiting means for converting each of said alternating signals into substantially square wave signals, a phase detector connected to said amplitude limiting means for producing an output signal indicative of the phase displacement between said square wave signals, a transformer having a primary winding for receiving the output signal from said phase detector and a secondary winding for developing two phase-opposed output voltages, a phase-sensitive bridge network for receiving the phase opposed output voltages from said secondary winding and producing an output signal indicative of the magnitude and sense of the said output voltages, a two-phase servo motor responsive to said output signal and having a shaft rotatable in dependence on the magnitude and sense of the output signal from said bridge network, a balancing potentiometer connected in said bridge network and having a wiper arm connected to and driven by said shaft in such a direction as to reduce the output from said bridge network toward zero, and an indicator having a scale calibrated in values of shaft torque and having a pointer coupled to said wiper arm and movable therewith across said scale.

8. A system for measuring torque in a rotary shaft comprising two discs spaced apart along said shaft, transducer means mounted adjacent said discs for respectively generating first and second alternating signals in response to the rotation of the discs, the two alternating signals having a phase displacement corresponding to the torsional deflection of that portion of the shaft between the discs, first and second squaring circuits for receiving and converting corresponding ones of the first and second alternating signals into substantially square wave signals, first and second differentiating circuits for receiving and differentiating corresponding ones of the two square wave signals, a two-stage switching circuit for receiving corresponding ones of the first and second differentiated signals and producing a train of output pulses the mean D.C. value of which is indicative of said phase displacement, temperature compensating means comprising a temperature-sensitive resistance mounted adjacent said shaft and connected to the output of said switching circuit for varying the said mean value in dependence on the temperature of said shaft, a chopper circuit for converting said mean D.C. value into an alternating signal, a transformer having a primary winding for receiving the alternating signal from said chopper circuit and a secondary winding for developing two phase-opposed output voltages, a phase-sensitive bridge network for receiving the phase opposed output voltages from said secondary winding and producing an output signal indicative of the magnitude and sense of the said output voltages, a first two-phase servo motor responsive to said output signal and having a shaft rotatable in dependence on the magnitude and sense of the output signal from said bridge network, a first balancing potentiometer connected in said bridge network and having a wiper arm connected to and driven by said shaft in such a direction as to reduce the output from said bridge network towards zero, a first indicator having a scale calibrated in values of shaft torque and having a pointer coupled to said wiper arm and movable therewith across said scale, a repeater amplifier having an input for receiving the output signal from said bridge network and an output, a second two-phase servo motor responsive to the output from said repeater amplifier and having a shaft rotatable in dependence on the magnitude and sense of the output from said repeater amplifier, a second balancing potentiometer connected in said bridge network and having a wiper arm connected to and driven by said shaft in the second servo motor in such a direction as to reduce the output from said bridge network towards zero, and a second indicator having a scale calibrated in values of shaft torque and having a pointer coupled to said wiper arm of the second potentiometer and movable therewith across said scale.

9. A system for measuring torque in a rotary shaft comprising two toothed wheels spaced apart along said shaft, transducer means mounted adjacent said toothed wheels for respectively generating two alternating signals in response to the rotation of the two wheels, the two alternating signals having a phase displacement corresponding to the torsional deflection of that portion of the shaft between the wheels, two squaring circuits for receiving and amplifying corresponding ones of the two alternating signals and limiting the magnitude of said signals on the positive-going and negative-going excursions thereof to produce substantially square wave signals, two differentiating circuits for receiving and differentiating corresponding ones of the two square wave signals, a bistable multivibrator comprising two transistors for receiving corresponding ones of the two differentiated signals and each exhibiting a non-conductive and conductive state in succession, each transistor being switched from one to its other state by the leading edge of the differentiated signal applied thereto and the other state of one of the transistors switching the other transistor to said one state whereby said multivibrator manifests a train of output pulses the mean D.C. value of which is indicative of said phase displacement, temperature compensating means comprising a temperature-sensitive resistance mounted adjacent said shaft and connected to the output of said multivibrator for varying the said mean value in dependence on the temperature of said shaft, a chopper circuit for converting said mean D.C. value into an alternating signal, a transformer having a primary winding for receiving the alternating signal from said chopper circuit and a secondary winding for developing two phase-opposed output voltages, a phase-sensitive bridge network for receiving the phase opposed output voltages from said secondary winding and producing an output signal indicative of the magnitude and sense of the said output voltages, a first two-phase servo motor responsive to said output signal and having a shaft rotatable in dependence on the magnitude and sense of the output signal from said bridge network, a first balancing potentiometer connected in said bridge network and having a wiper arm connected to and driven by said shaft in such a direction as to reduce the output from said bridge network towards zero, a first indicator having a scale calibrated in values of shaft torque and having a pointer coupled to said wiper arm and movable therewith across said scale, a repeater amplifier having an input for receiving the output signal from said bridge network and an output, a second two-phase servo motor responsive to the output from said repeater amplifier and having a shaft rotatable in dependence on the magnitude and sense of the output from said repeater amplifier, a second balancing potentiometer connected in said bridge network and having a wiper arm connected to and driven by said shaft in the second servo motor in such a direction as to reduce the output from said bridge network towards zero, and a second indicator having a scale calibrated in values of shaft torque and having a pointer coupled to said wiper arm of the second potentiometer and movable therewith across said scale.

10. An arrangement for measuring torque in a rotary shaft in port and starboard aircraft engines, comprising two systems according to claim 9, associated with the port and starboard engines, respectively, wherein said first indicator in each system comprises, said pointer coupled to the wiper arm of the first potentiometer in one system and a further pointer coupled to the wiper arm of the first potentiometer in the other system whereby the torque in both the port and starboard engines is indicated simultaneously on said first indicator, and wherein said second indicator in each system comprises, said pointer coupled to the wiper arm of the second potentiometer in said one system and a further pointer coupled to the wiper arm of the second potentiometer in the other system whereby the torque in both port and starboard engines is indicated simultaneously in said second indicator.

11. A system according to claim 7, comprising a repeater amplifier having an input for receiving the output signal from said bridge network and an output, a further two-phase servo motor responsive to the output from said repeater amplifier and having a shaft rotatable in dependence on the magnitude and sense of the output from said repeater amplifier, a further balancing potentiometer connected in said bridge network and having a wiper arm connected to and driven by said shaft in the further servo motor in such a direction as to reduce the output from said bridge network towards zero, and a further indicator having a scale calibrated in values of shaft torque and having a pointer coupled to said wiper arm of the second potentiometer and movable therewith across said scale.

References Cited by the Examiner

UNITED STATES PATENTS 2,766,617  10/1956  Tyler et al. _____ 73—136

FOREIGN PATENTS 601,460  5/1948  Great Britain.

RICHARD C. QUEISSER, *Primary Examiner.*

C. A. RUEHL, *Assistant Examiner.*